(12) United States Patent
Zhu et al.

(10) Patent No.: US 12,542,934 B2
(45) Date of Patent: Feb. 3, 2026

(54) ZERO-DELAY PANORAMIC VIDEO BIT RATE CONTROL METHOD CONSIDERING TEMPORAL DISTORTION PROPAGATION

(71) Applicant: UNIVERSITY OF ELECTRONIC SCIENCE AND TECHNOLOGY OF CHINA, Chengdu (CN)

(72) Inventors: Ce Zhu, Chengdu (CN); Xu Yang, Chengdu (CN); Lei Luo, Chengdu (CN); Hongwei Guo, Chengdu (CN); Chang Duan, Chengdu (CN); Jin Du, Chengdu (CN); Jingjing Hou, Chengdu (CN)

(73) Assignee: UNIVERSITY OF ELECTRONIC SCIENCE AND TECHNOLOGY OF CHINA, Chengdu (CN)

( * ) Notice: Subject to any disclaimer, the term of this patent is extended or adjusted under 35 U.S.C. 154(b) by 0 days.

(21) Appl. No.: 18/995,194

(22) PCT Filed: Apr. 11, 2023

(86) PCT No.: PCT/CN2023/087513
§ 371 (c)(1),
(2) Date: Jan. 16, 2025

(87) PCT Pub. No.: WO2024/082579
PCT Pub. Date: Apr. 25, 2024

(65) Prior Publication Data
US 2026/0006262 A1    Jan. 1, 2026

(30) Foreign Application Priority Data
Oct. 18, 2022  (CN) .......................... 202211273536.1

(51) Int. Cl.
*H04N 19/96*  (2014.01)
*G06V 10/75*  (2022.01)
(Continued)

(52) U.S. Cl.
CPC .......... *H04N 19/96* (2014.11); *G06V 10/751* (2022.01); *H04N 19/124* (2014.11);
(Continued)

(58) Field of Classification Search
None
See application file for complete search history.

(56) References Cited

U.S. PATENT DOCUMENTS 10,110,814 B1 * 10/2018 Day ....................... G06V 20/40
11,671,588 B2 * 6/2023 Hannuksela ........... H04N 19/51
375/240.12
(Continued)

FOREIGN PATENT DOCUMENTS

| CN | 113489981 A | 10/2021 |
| CN | 115022638 A | 9/2022 |

(Continued)

*Primary Examiner* — Stuart D Bennett
(74) *Attorney, Agent, or Firm* — Bayramoglu Law Offices LLC (57) ABSTRACT

A zero-delay panoramic video bit rate control method that considers distortion temporal propagation aims to optimize target bit allocation and achieve global rate-distortion optimization in coding. It encompasses coding tree unit (CTU)-level bit rate control and temporal global rate-distortion optimization. CTU-level bit rate control involves optimizing target bit allocation and updating bit rate control parameters. Temporal global rate-distortion optimization utilizes the reconstruction error and motion compensation prediction error information of the previous coded frame to estimate the temporal dependence between CTUs in the current coding frame and those in the previous coded frame to adjust the coding parameters of the current CTU. The coding parameters are further fine-tuned according to the area stretching ratio encountered during the projection of the panoramic video from a 3D spherical surface to a 2D plane, (Continued)

taking into consideration the detrimental impact of interpolated redundant pixels on the coding process.

5 Claims, 1 Drawing Sheet (51) Int. Cl.
*H04N 19/124* (2014.01)
*H04N 19/159* (2014.01)
*H04N 19/172* (2014.01)
*H04N 19/177* (2014.01)

(52) U.S. Cl.
CPC ......... *H04N 19/159* (2014.11); *H04N 19/172* (2014.11); *H04N 19/177* (2014.11)

(56) References Cited

U.S. PATENT DOCUMENTS

| | | | | |
|---|---|---|---|---|
| 2019/0158849 A1* | 5/2019 | Yu | ........................ | H04N 19/154 |
| 2019/0289055 A1* | 9/2019 | Huang | ............... | H04N 21/4728 |
| 2021/0337202 A1* | 10/2021 | Xiu | ...................... | H04N 19/186 |
| 2022/0007031 A1* | 1/2022 | Zhu | ...................... | H04N 19/567 |

FOREIGN PATENT DOCUMENTS

| | | |
|---|---|---|
| CN | 115695799 A | 2/2023 |
| WO | 2020172813 A1 | 9/2020 |

\* cited by examiner

ZERO-DELAY PANORAMIC VIDEO BIT RATE CONTROL METHOD CONSIDERING TEMPORAL DISTORTION PROPAGATION

CROSS REFERENCE TO THE RELATED APPLICATIONS

This application is the national phase entry of International Application No. PCT/CN2023/087513, filed on Apr. 11, 2023, which is based upon and claims priority to Chinese Patent Application No. 202211273536.1, filed on Oct. 18, 2022, the entire contents of which are incorporated herein by reference.

TECHNICAL FIELD

The present application belongs to the technical field of image processing, and in particular, relates to a zero-delay panoramic video bit rate control method considering distortion temporal propagation influence.

BACKGROUND

A panoramic video is a video shot by a camera array or a 3D video camera in all-round 360 degrees. A user can adjust the up, down, left and right directions of the video at will for watching when watching the video. The panoramic video has the characteristics of high frame rate, high resolution (at least 4K) and wide field of vision, so saving and transmitting the panoramic video will consume a lot of resources. Bit rate control is to optimize the bit allocation layer by layer according to the target bit rate and dynamically adjust the coding parameter of the encoder according to a certain coding strategy, so that the encoder outputs a code stream to meet the bandwidth limitation of a transmission channel and the requirement of a storage space of a storage device, and the actual output bit rate is consistent with the target bit rate as much as possible. The bit rate control is widely applied to a real-time video communication system. The traditional panoramic video has the following problems: first, the pixel redundancy will be generated in the projection process to affect the coding performance; meanwhile, the traditional encoder does not use the temporal correlation of distortion between interframe coding units for coding, and the coding performance still has a great room for improvement; and the main reason why the traditional encoder does not consider the interframe influence factor of distortion is that the calculation complexity is too high, which is not conducive to real-time communication. In view of the above problems, the present application provides a zero-delay panoramic video bit rate control method considering distortion temporal propagation influence. According to the present application, first, the coding parameter is adjusted according to a ratio of the area of a panoramic video spherical surface and the projection area so as to reduce the loss of the coding performance caused by the pixel redundancy; meanwhile, whether an image scenario is changed is determined by calculating the change quantity of the pixel mean value and variance value of the coding frame; and when the scenario change does not occur, the distortion temporal propagation influence factor is calculated based on that the video image has the characteristic of continuity and by using the reconstruction error and motion compensation prediction error of the previous coding frame in the time domain, and the current frame is coded by the factor. According to the present application, it is unnecessary to pre-store an uncoded frame, the distortion temporal propagation influence factor is calculated by coded frame information, the calculation quantity is small, the coding complexity is extremely low, and the rate-distortion performance can be greatly improved, so the present application is easy to popularize.

The current bit rate control method includes:
an H.266/VVC bit rate control method mainly includes the following steps:
Step 1: bit allocation VTM adopts a layered bit allocation structure to perform bit allocation respectively on a Group of Pictures (GOP) layer, a frame layer and a CTU layer. The further down, the more accurate the bit rate allocation, and the better it is to correct the error. VTM allocates the target bit rate on averagely at all levels. To gradually eliminate the bit rate control error generated by the coded unit, bit rate fluctuation is smoothed by a sliding window, so that the influence on the video quality caused by the great bit rate fluctuation. Layered bit rate allocation is implemented by the following formulas, that is, $$R_{pic} = \frac{R_{tar}}{FR}$$

$$T_{gop} = \frac{R_{pic} \cdot (N_{coded} + SW) - R_{coded}}{SW} \cdot N_{gop}$$

$$T_{pic} = \frac{T_{gop} - R_{coded_{gop}}}{\sum_{notcoded_{pic_{gop}}} \omega_{pic}} \cdot \omega_{pic_{cur}}$$

$$T_{ctu} = \frac{T_{pic} - R_{coded_{gop}}}{\sum_{notcoded_{ctu_{pic}}} \omega_{ctu}} \cdot \omega_{ctu_{cur}}$$

where $R_{tar}$ is a target bit rate, FR is a frame rate, $R_{pic}$ is the number of bits per frame of the whole sequence, $T_{gop}$, $T_{pic}$ and $T_{ctu}$ are respectively the number of target bits of the GOP to be coded, the coding frame and the coding unit, SW is a sliding window for smoothing bit allocation, and $N_{coded}$, $R_{coded}$, $N_{gop}$, $R_{coded_{gop}}$, $\omega_{pic}$, $\omega_{ctu}$, $$\sum_{n0tcoded_{pic_{gop}}}$$

$\omega_{pic}$ and $$\sum_{n0tcoded_{ctu_{pic}}}$$

$\omega_{ctu}$ are respectively the number of the coded frames, the bits consumed by the coded video sequence, a GOP frame number, the number of coded frames in the GOP, the weight of the coding frame, the weight of the coding unit, the sum of the weights of the uncoded frames and the sum of the uncoded CTU in the frame.

Step 2: the Lagrange multiplier is calculated according to a R-λ model.

$$\lambda_i = -\frac{\partial D_i}{\partial R_i}$$

The Lagrange multiplier $\lambda_i$ is the slope of the rate-distortion curve, and $D_i$ and $R_i$ are respectively the distortion and coding bit of the $i^{th}$ coding unit and the relationship between the Lagrange multiplier $\lambda_i$ and the bit rate $R_i$.

$$\lambda_i = c_i \cdot k_i \cdot R_i^{-k_i-1} \xrightarrow[\beta_i=-k_i-1]{\alpha_i=c_i \cdot k_i} \lambda_i = \alpha_i \cdot R_i^{\beta_i}$$

Step 3: the coding parameter is updated.

The parameters in the above formula will be updated automatically after one frame or one coding tree unit is coded. The parameter updating formula is:

$$c_i = \frac{D_i}{R_i^{-\lambda_i \cdot \frac{R_i}{D_i}}} \text{ and } k_i = \frac{\lambda_i \cdot R_i}{D_i}$$

In the formula, $D_i$ and $R_i$ can be determined after one frame or one CTU is coded, the frame-level $\lambda_i$ is replaced with the Lagrange multiplier of the most adjacent coded frame on the same level in the same GOP, and CTU-level $\lambda_i$ is replaced with the Lagrange multiplier of the CTU corresponding to the most adjacent coded frame on the same level with the coding frame, so as to update the parameters $c_i$ and $k_i$.

Step 4: the quantization parameter (QP) used in the coding process is calculated.

$$QP_i = 4.2005 \cdot \ln \lambda_i + 13.7122$$

It can be seen that the quantization parameter in the bit rate control algorithm and the logarithm of the Lagrange multiplier can be fitted by a linear function relationship.

The traditional bit rate control method has the following problem that an R-Lambda bit rate control model in VVC can reach a high control accuracy, but does not consider the problem of pixel redundancy of the panoramic video caused by projection. Meanwhile, the interframe correlation of distortion is not used for rate-distortion optimization coding, so the coding quality has a great room for improvement.

SUMMARY

In view of the above problem, the present application provides a zero-delay panoramic video bit rate control method considering time-domain distortion propagation. The method according to the present application is mainly for optimizing target bit allocation and global rate-distortion optimization, and includes coding tree unit (CTU)-level bit rate control and temporal global rate-distortion optimization. The CTU-level bit rate control mainly includes optimizing target bit allocation and updating bit rate control parameters. The temporal global rate-distortion optimization primarily quantifies the temporal correlation between the current coding frame and the nearest previously coded frame by calculating the proportional relationship of the reconstruction distortion and motion compensation prediction distortion for each CTU (Coding Tree Unit). It then adjusts the coding parameters based on the magnitude of this temporal correlation. Additionally, the coding parameters are further adjusted according to the area stretching ratio during the process of projecting the panoramic video from a 3D spherical surface to a 2D plane, taking into account the adverse effects of interpolated redundant pixels on the coding process.

The technical solution of the present application is as follows:
a zero-delay panoramic video bit rate control method, which considers the influence of distortion temporal propagation and redundant pixels, includes the following steps:

S1: inputting a target bit rate and a sequence to be coded to an encoder;

S2: determining whether a current frame is a first frame, and if so, performing the following operations:
calculating a latitude value corresponding to a CTU line and calculating an area stretching ratio of a spherical surface and a projection plane thereof,
initializing the parameters of a bit rate control unit,
calculating the number of target bits of the current frame,
calculating a frame-level Lagrange multiplier of the current frame according to the number of the target bits,
calculating a frame-level QP according to the frame-level Lagrange multiplier and performing intraframe coding,
repeating step S2 after coding the current frame,
otherwise, entering step S3;

S3: calculating pixel mean and variance values of a frame;

S4: determining whether the current frame number is greater than twice the GOP size, if so, entering S5, otherwise, entering S6;

S5: calculating a global Lagrange multiplier according to an iterative algorithm, optimizing bit allocation of each CTU in the frame, and entering step S7;

S6: using the bit allocation algorithm of the encoder to allocate bits for each CTU in the frame;

S7: calculating the frame-level Lagrange multiplier and QP;

S8: coding the CTUs in sequence;

S9: determining whether a difference value between the pixel variance values of the current frame and the previous frame is greater than a threshold, if so, entering step S10, otherwise, entering step S1;

S10: adjusting a Lagrange multiplier of the current CTU according to the area stretching ratio obtained in step S2, and entering step S13;

S11: determining the current frame number is greater than 3, if so, entering S13, otherwise, entering S10;

S12: adjusting the Lagrange multiplier of each CTU according to the temporal distortion influence factor of the previous frame and the area stretching ratio obtained in S2;

S13: calculating the quantization parameter (QP) of the current CTU according to the Lagrange multiplier of the current CTU calculated in S10 or S12, and coding the CTU;

S14: determining whether the current CTU is a last CTU, if so, coding the current frame and entering step S15, otherwise, returning to step S8;

S15: updating bit rate control parameters and the number of actually used bits of the current frame and each CTU;

S16: acquiring a reconstruction error and a motion compensation prediction error of each CTU saved in the current frame to calculate the temporal distortion influence factor of each CTU in the current frame;

S17: determining whether the current frame is the last frame, if so, entering S18, otherwise, entering S2;

S18: completing coding of a current panoramic video sequence.

Further, in step S2, if a radius of a panoramic video sphere is defined as r, the area of a spherical girdle region with the latitude θ is:

$$S_s(\theta) = 2\pi \cdot r^2 \cdot \cos\theta \cdot \sin d\theta$$

after being projected onto a 2D plane, the area of a stretching region is obtained as follows:

$$S_E(\theta) = S_E\left(\frac{\pi}{2}\right) = 2\pi \cdot r^2 \cdot \sin d\theta$$

then the area stretching ratio is:

$$k(\theta) = \frac{S_S(\theta)}{S_E(\theta)} = \frac{S_S(\theta)}{S_E(0^0)} = \cos\theta.$$

Further, step S3 is specifically as follows:

$$P = \frac{1}{n*m}\sum_{i=0}^{m-1}\sum_{j=0}^{n-1}P_{i,j}$$

$$D = \frac{1}{n*m}\sum_{i=0}^{m-1}\sum_{j=0}^{n-1}(P_{i,j} - p)$$

where P and D respectively represent a mean value and a variance, $P_{i,j}$ represents a pixel value of each pixel point, and the resolution is n*m.

Further, step S5 is specifically as follows:

$$R = \sum_{i=1}^{M}r_i = \sum_{i=1}^{M}\left(\frac{\lambda_g}{c_i \cdot k_i}\right)^{\frac{-1}{k_i+1}} = \sum_{i=1}^{M}\left(\frac{\alpha_i}{\lambda_g}\right)^{\beta_i}$$

where R and r are respectively frame-level and CTU-level target bits, $\lambda_g$ is the global Lagrange multiplier, $$\alpha_i = c_i \cdot k_i, \beta_i = \frac{1}{k_i+1}, c_i = \frac{D_i}{R_i^{-\lambda_i\frac{R_i}{D_i}}}, k_i = \frac{\lambda_i \cdot R_i}{D_i},$$

$\lambda_i$ is a slope of a rate-distortion curve, $D_i$ and $R_i$ are respectively distortion and coding bit of an $i^{th}$ coding unit, and M is the number of CTUs.

Further, in the step 10, a method for adjusting the Lagrange multiplier is as follows:

$$\lambda_n = \frac{\lambda_P}{k(\theta)}$$

where $\lambda_p$ is the frame-level Lagrange multiplier, and $\lambda_n$ is the adjusted Lagrange multiplier.

Further, in the step 12, a method for adjusting the Lagrange multiplier is as follows:

$$\lambda_n = \frac{\lambda_P}{k*k(\theta)}$$

where k is the time-domain distortion influence factor.

The present application has the following beneficial effects: according to the present application, on the premise of reducing the coding complexity and not caching the subsequent frame, the bit rate control error can be very small, the coding time can be effectively shortened, and the video coding quality can be improved under the condition of the given bandwidth.

DETAILED DESCRIPTION OF THE EMBODIMENTS

Figure 1:
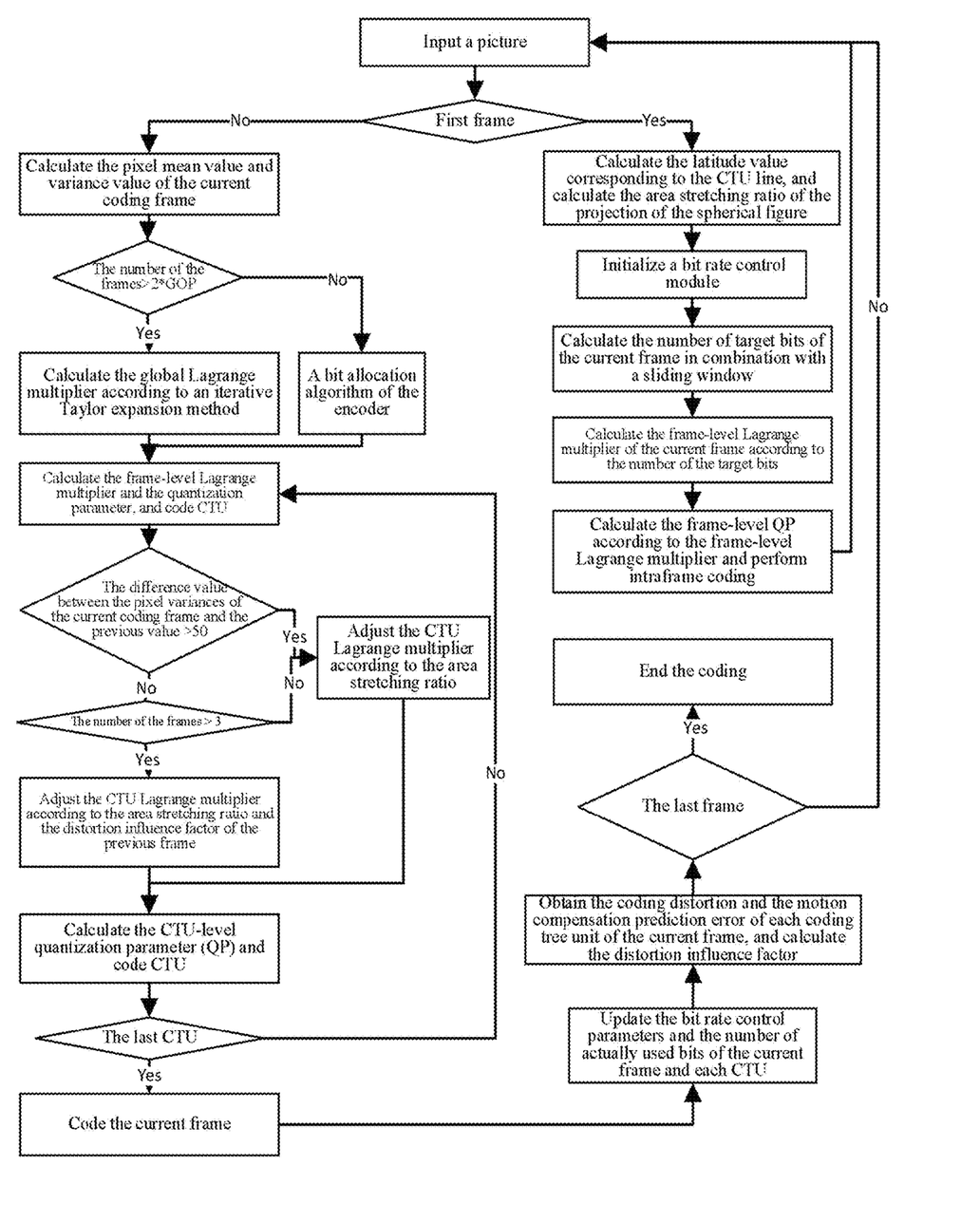
FIGURE is a flowchart of a method according to the present application.

The present application is described in detail below with reference to the accompanying drawing.

In the video bit rate control, an encoder selects a group of optimal coding parameters and a coding mode with a minimum rate-distortion cost for an input video through a rate-distortion optimization (RDO) technology. The objective is to reduce the coding distortion as much as possible under a certain bit rate limited condition or reduce a coding bit as much as possible under a certain coding distortion restriction condition. A zero-delay method provided by the present application means that an encoder is not allowed to obtain information of a subsequent frame in advance, that is, data is not cached and analyzed after a frame to be coded is obtained and is necessarily coded at once. The specific implementation manner is shown in FIGURE.

For an input first frame image, a time-domain distortion influence factor has not been obtained inside the encoder, so it is necessary to initialize the internal parameters of the encoder based on the given target bit rate first. The initialization mode is consistent with that in a VVC bit rate control method. The number of target bits of each coding level is:

$$R_{pic} = \frac{R_{tar}}{FR}$$

$$T_{gop} = \frac{R_{pic} \cdot (N_{coded} + SW) - R_{coded}}{SW} \cdot N_{gop}$$

$$T_{pic} = \frac{T_{gop} - R_{coded_{gop}}}{\sum_{notcoded pic_{gop}} \omega_{pic}} \cdot \omega_{pic_{cur}}$$

$$T_{ctu} = \frac{T_{pic} - R_{coded_{gop}}}{\sum_{notcoded ctu_{pic}} \omega_{ctu}} \cdot \omega_{ctu_{cur}}$$

where $R_{tar}$ is a target bit rate, FR is a frame rate, $R_{pic}$ is the number of bits per frame of the whole sequence, $T_{gop}$, $T_{pic}$ and $T_{ctu}$ are respectively the number of target bits of the GOP to be coded, the coding frame and the coding unit, SW is a sliding window for smoothing bit allocation, and $N_{coded}$, $R_{coded}$, $N_{gop}$, $R_{coded_{gop}}$, $\omega_{pic}$, $\omega_{ctu}$, $$\sum_{n0tcoded pic_{gop}}$$

$\omega_{pic}$ and $$\sum_{n0tcoded ctu_{pic}}$$

$\omega_{ctu}$ are respectively the number of the coded frames, the bits consumed by the coded video sequence, a GOP frame number, the number of coded frames in the GOP, the weight of the coding frame, the weight of the coding unit, the sum of the weights of the uncoded frames and the sum of the uncoded CTU in the frame.

Different from the traditional method, in the method provided by the present application, it is also necessary to calculate a latitude value corresponding to a CTU line and calculate an area stretching ratio of a spherical surface and a projection plane thereof. The specific method is as follows:

r is defined as a radius of a sphere, and the area of a spherical surface girdle region with the latitude θ can be calculated as:

$$S_s(\theta) = 2\pi \cdot r^2 \cdot \cos\theta \cdot \sin d\theta$$

Corresponding to the projection of a 2D plane, the area of the stretching area is:

$$S_E(\theta) = S_E\left(\frac{\pi}{2}\right) = 2\pi \cdot r^2 \cdot \sin d\theta$$

An area ratio before and after projection is:

$$k(\theta) = \frac{S_S(\theta)}{S_E(\theta)} = \frac{S_S(\theta)}{S_E(0^0)} = \cos\theta$$

It can be seen that the ratio decreases with the increase of the latitude, in the equatorial region, that is, at the latitude θ of 0, the area ratio is 1, without stretching. Assuming that the entropy of the equatorial region has not changed before and after the projection, and the closer to the pole, the greater the entropy change.

Starting from a second image group GOP, the optimal Lagrange multiplier in a bit allocation formula is approximated by an iterative algorithm. The bits are allocated by the optimal Lagrange multiplier, specifically as follows:

$$R = \sum_{i=1}^{M} r_i = \sum_{i=1}^{M} \left(\frac{\lambda_g}{c_i \cdot k_i}\right)^{\frac{-1}{k_i+1}} = \sum_{i=1}^{M} \left(\frac{\alpha_i}{\lambda_g}\right)^{\beta_i}$$

In the formula, R and r are respectively frame-level and CTU-level target bits, $\lambda_g$ is the global Lagrange multiplier, $a_i = c_i \cdot k_i$, $$\beta_i = \frac{1}{k_i + 1},$$

and one frame has M CTUs.

For the second frame and the subsequent images, the Lagrange multiplier can be adjusted by selecting the area-based stretching ratio. For the third frame and the subsequent images, since the time-domain distortion influence factor has been obtained, the Lagrange multiplier is adjusted based on the time-domain distortion influence factor and the area stretching ratio, specifically as follows: a new Lagrange multiplier $\lambda_n$ is obtained by dividing the original Lagrange multiplier by an adjusting weight, so that time-domain rate-distortion optimization is achieved.

$$\lambda_n = \frac{\lambda_P}{k * k(\theta)}$$

where $\lambda_p$ is the frame-level Lagrange multiplier. Apparently, the larger the latitude value θ, the smaller k(θ), the larger the adjusted Lagrange multiplier, and vice versa; meanwhile, for the coding tree unit with strong time-domain dependence, the larger k is, the smaller the adjusted Lagrange multiplier is, which means that the distortion will be reduced and it is beneficial for the subsequent frame to achieve higher rate-distortion performance; on the contrary, the coding tree unit with weak time-domain dependence will be coded relatively poorly.

The condition of selecting a Lagrange multiplier adjusting mode is to determine whether a difference value between the pixel variance value of the current frame and the previous frame is greater than a threshold of 50. Since the premise of the time-domain distortion propagation is the continuity of a video image, if image scenario switching occurs, a propagation chain will be disconnected, whether the scenario is switched is determined through the transformation quantity of the image variance value.

$$P = \frac{1}{n*m}\sum_{i=0}^{m-1}\sum_{j=0}^{n-1} P_{i,j}$$

$$D = \frac{1}{n*m}\sum_{i=0}^{m-1}\sum_{j=0}^{n-1} (P_{i,j} - p)$$

where P and D respectively represent a mean value and a variance, $P_{i,j}$ represents a pixel value of each pixel point, and the resolution is n*m.

The calculation mode of the Lagrange multiplier and QP is as follows:

first, the average number ($T_{bpp}$) of target bits per pixel of the current frame image is calculated. The calculation formula is:

$$T_{bpp} = T_{pic}/N_{pixels}$$

$N_{pixels}$ refers to the number of pixels of a picture. Then the frame-level Lagrange parameter of the current image is calculated.

For a frame I: a bit rate control method based on an intraframe complexity is adopted. According to the experiment, the intraframe complexity is defined as $$\frac{MAD}{BPP},$$

then $$\frac{MAD}{BPP}$$

and the Lagrange multiplier have the following relationship:

$$\lambda = \alpha \frac{MAD^\beta}{BPP}$$

where MAD is the average absolute value error of the pixel, and BPP is the average target bit of the pixel. The initial values of the parameters α and β are empirically set to 9.9416 and −1.367.

For a frame P: the calculation mode is $\lambda=\alpha R^\beta$, the initial value of α is set to 1058, and the value of β is set to −1.327.

The corresponding frame-level QP is calculated by using the following relational expression:

$$QP_i = 4.2005 \cdot \ln \lambda_i + 13.7122$$

after coding of one frame image is completed, the bit rate control parameters of the current frame and each CTU as well as the number of actually used bits are updated, a reconstruction error and a motion compensation prediction error of each CTU saved in the current frame are obtained to calculate a time-domain distortion influence factor of each CTU in the current frame. Specifically, the time-domain dependence in video coding is measured by using the reconstruction distortion and the motion compensation prediction error distortion of the coding tree unit, that is, $$k = \frac{D_{cur}}{D_{cur}^{MCP}}$$

the distortion $D_{cur}$ of a coding block and the motion compensation prediction error $$D_{cur}^{MCP}$$

of the coding block. For the current coding block, the distortion thereof cannot be obtained before the real coding. To achieve zero delay, it is considered to approximately replace the time-domain dependence of the current block with the coding tree unit information at the corresponding position of the previous frame. This is because the image characteristics of the adjacent two frames are generally similar. Meanwhile, whether scenario switching occurs in the image is determined according to the difference between the pixel mean value and variance value of the current frame and the previous frame so as to determine whether to use the distortion influence factor.

Automatic update will be performed after one frame or one coding tree unit (CTU) is coded. The parameter updating formula is:

$$c_i = \frac{D_i}{R_i^{-\lambda_i \frac{R_i}{D_i}}} \text{ and } k_i = \frac{\lambda_i \cdot R_i}{D_i}$$

In the formula, the distortion $D_i$ and the bit rate $R_i$ can be determined after one frame or one CTU is coded, the frame-level $\lambda_i$ is replaced with the Lagrange multiplier of the most adjacent coded frame on the same level in the same GOP, and CTU-level $\lambda_i$ is replaced with the Lagrange multiplier of the CTU corresponding to the most adjacent coded frame on the same level with the coding frame, so as to update the parameters $c_i$ and $k_i$.

The effectiveness of the scheme of the present application is described below by using the experimental results. A panoramic video bit rate control algorithm is integrated into H.266/VVC reference software VTM14.0 based on 360lib, the encoder is configured as Lowdelay-P, the experimental conditions comply with the standard panoramic video sequence recommended by International Coding Organization for Standardization JCT-VC as a test video, including all 14 video sequences in three categories of 8K, 6K and 4K, and the comparison indexes are BD-Rate, bit rate control accuracy and coding time. When the BD-Rate is negative, it means that the bit rate decreases under the same reconstruction quality and the technology has gain; and when the BD-Rate is positive, it means that the bit rate increases under the same reconstruction quality and the technology has a loss. Here, the coding quality of the VVC encoder and the bit rate control algorithm of VVC when QP is given are taken as a comparative basis.

Table 1 shows the performance of this scheme and the bit rate control method of VTM14.0 and 360lib on BD-Rate. Compared with the bit rate control method of vtm, the bit rate is greatly saved, and the bit rate is saved by 8.7% in this method.

TABLE 1

Comparison with the coding BD-rate of the VTM14.0 bit rate control algorithm

| Class | sequence | SPSNR | | | CPP-PSNR | | | WS-PSNR | | |
|---|---|---|---|---|---|---|---|---|---|---|
| 8K | Trolley | −20.56% | −22.24% | −17.07% | −20.62% | −22.19% | −17.05% | −20.76% | −22.19% | −17.01% |
| | GasLamp | −16.49% | −16.36% | −17.66% | −16.43% | −16.33% | −17.61% | −16.12% | −16.38% | −17.62% |
| | Skateboarding_in_lot | −9.94% | −12.23% | −11.39% | −9.88% | −12.17% | −11.33% | −9.90% | −12.18% | −11.36% |
| | Chairlift | −8.67% | 8.95% | −4.33% | −8.59% | 8.94% | −4.29% | −8.51% | 8.79% | −4.31% |
| | KiteFlite | −6.17% | −5.15% | −7.21% | −6.31% | −5.14% | −7.13% | −6.04% | −5.16% | −7.14% |
| | Harbor | −5.88% | −3.18% | −1.56% | −6.10% | −3.34% | −1.72% | −6.13% | −3.37% | −1.76% |
| 6K | Balboa | −3.97% | −1.63% | −2.07% | −5.25% | −5.97% | −7.10% | −4.64% | −3.71% | −4.49% |
| | Broadway | −3.53% | −4.47% | −4.13% | −3.67% | −4.59% | −4.28% | −3.65% | −4.60% | −4.30% |
| | Landing | −3.55% | −2.90% | −4.18% | −3.56% | −2.96% | −4.20% | −3.57% | −2.96% | −4.15% |
| | BranCastle | −6.13% | −4.79% | −4.56% | −6.16% | −4.85% | −4.59% | −6.09% | −4.81% | −4.58% |
| 4K | Pole Vault | −10.42% | 2.38% | 8.21% | −10.58% | 1.70% | 7.53% | −10.58% | 1.36% | 7.26% |
| | AerialCity | −12.79% | 1.91% | −10.17% | −12.74% | 1.43% | −10.12% | −12.73% | 1.29% | −10.14% |
| | DrivingInCity | −2.99% | −0.49% | −3.37% | −3.05% | −0.67% | −3.56% | −3.01% | −0.72% | −3.45% |
| | DrivingInCountry | −11.24% | 4.05% | −0.38% | −11.23% | 3.73% | −0.29% | −11.19% | 3.49% | −0.39% |
| | Overall | −8.74% | −4.01% | −5.70% | −8.87% | −4.46% | −6.12% | −8.78% | −4.37% | −5.96% |

Table 2 shows a comparison between this scheme and the rate-distortion optimization algorithm of VTM14.0 on BD-rate, and the bit rate is saved averagely by about 4.3%.

TABLE 2

Comparison with the rate-distortion optimization algorithm of VTM14.0 on BD-rate

| | | SPSNR | | | CPP-PSNR | | | WS-PSNR | | |
|---|---|---|---|---|---|---|---|---|---|---|
| 8K | Trolley | −10.63% | −1.26% | 4.93% | −10.71% | −1.46% | 4.94% | −11.63% | −1.41% | 4.98% |
| | GasLamp | 7.39% | 26.42% | 27.47% | 7.27% | 26.47% | 27.54% | 6.99% | 26.49% | 27.53% |
| | Skateboarding_in_lot | −6.49% | −13.89% | −15.76% | −6.50% | −13.86% | −15.80% | −6.87% | −13.87% | −15.77% |
| | Chairlift | −7.87% | 1.92% | −15.73% | −7.87% | 1.88% | −15.79% | −7.80% | 1.76% | −15.77% |
| | KiteFlite | −2.07% | 4.09% | 1.98% | −2.11% | 4.15% | 2.16% | −2.35% | 4.20% | 2.21% |
| | Harbor | −0.75% | 8.01% | 7.16% | −1.01% | 7.94% | 6.89% | −1.23% | 7.89% | 6.85% |
| 6K | Balboa | −4.83% | −9.80% | −11.34% | −5.02% | −10.09% | −11.49% | −5.11% | −10.07% | −11.49% |
| | Broadway | −0.93% | −7.36% | −5.13% | −1.15% | −7.69% | −5.49% | −1.27% | −7.68% | −5.46% |
| | Landing | −7.80% | −17.51% | −16.68% | −7.79% | −17.94% | −17.24% | −7.54% | −17.96% | −17.28% |
| | BranCastle | −2.14% | 7.94% | −1.09% | −2.25% | 7.26% | −1.49% | −2.58% | 7.29% | −1.51% |
| 4K | Pole Vault | −9.08% | −2.98% | −0.36% | −8.91% | −3.37% | −0.73% | −9.03% | −3.74% | −0.92% |
| | AerialCity | −6.17% | 3.03% | −9.99% | −6.14% | 2.49% | −10.11% | −6.14% | 2.17% | −10.05% |
| | DrivingInCity | −0.31% | −9.64% | −10.97% | −0.38% | −9.77% | −11.11% | −0.40% | −9.70% | −10.93% |
| | DrivingInCountry | −9.16% | −9.28% | −14.72% | −9.16% | −9.72% | −14.83% | −9.18% | −9.88% | −14.83% |
| | Overall | −4.34% | −1.45% | −4.30% | −4.41% | −1.69% | −4.47% | −4.58% | −1.75% | −4.46% |

Table 3 shows the size of the coding bit rate control errors of this scheme, VTM14.0 and 360lib The calculation method of the bit error rate is: the absolute error between the actual coding output bit rate and the set target bit rate is divided by the target bit rate. The larger the deviation, the higher the bit error rate, and the lower the bit rate control accuracy. This scheme ensures an extremely low bit rate control error of 0.0891%.

TABLE 3

Bit rate control error comparison

| Panoramic video sequence | Target bit rate | The coding bit rate of the method of the present application | VTM bit rate control | The control error of the method of the present application | System bit rate control algorithm error |
|---|---|---|---|---|---|
| Trolley | 7396.696 | 7398.3304 | 7398.3216 | 0.000221 | 0.000220 |
| | 2920.2608 | 2922.7144 | 2921.5416 | 0.000840 | 0.000439 |
| | 1293.232 | 1295.6536 | 1294.3456 | 0.001873 | 0.000861 |
| | 594.536 | 596.1488 | 595.7336 | 0.002713 | 0.002014 |
| GasLamp | 1949.1064 | 1951.4456 | 1950.7312 | 0.001200 | 0.000834 |
| | 788.5016 | 789.792 | 789.6704 | 0.001637 | 0.001482 |
| | 351.5208 | 352.792 | 352.6336 | 0.003616 | 0.003166 |
| | 165.9464 | 167.064 | 166.9784 | 0.006735 | 0.006219 |
| Skateboarding_in_lot | 30761.182 | 30765.7872 | 30763.0608 | 0.000150 | 0.000061 |
| | 11031.476 | 11034.6288 | 11032.9904 | 0.000286 | 0.000137 |
| | 4185.1928 | 4187.1936 | 4186.6744 | 0.000478 | 0.000354 |
| | 1669.6216 | 1671.2688 | 1670.9872 | 0.000987 | 0.000818 |
| ChairliftRide | 15486.484 | 15490.0552 | 15488.932 | 0.000231 | 0.000158 |
| | 5416.496 | 5419.2272 | 5418.3976 | 0.000504 | 0.000351 |
| | 2236.8192 | 2238.592 | 2238.588 | 0.000793 | 0.000791 |
| | 956.9408 | 958.3864 | 958.3368 | 0.001511 | 0.001459 |
| Kite Flite | 17472.349 | 17474.8032 | 17474.3424 | 0.000140 | 0.000114 |
| | 6869.8136 | 6871.5664 | 6871.5784 | 0.000255 | 0.000257 |
| | 2892.432 | 2894.0256 | 2894.128 | 0.000551 | 0.000586 |
| | 1230.4768 | 1231.7616 | 1231.872 | 0.001044 | 0.001134 |
| Harbor | 6333.7528 | 6335.4216 | 6335.3816 | 0.000263 | 0.000257 |
| | 2421.8088 | 2423.0648 | 2423.02 | 0.000519 | 0.000500 |
| | 962.424 | 963.5328 | 963.5248 | 0.001152 | 0.001144 |
| | 387.8984 | 389.1032 | 388.9304 | 0.003106 | 0.002660 |
| Balboa | 36959.294 | 36964.3024 | 36963.0376 | 0.000136 | 0.000101 |
| | 12888.714 | 12892.792 | 12892.148 | 0.000316 | 0.000266 |
| | 5512.3888 | 5515.9928 | 5515.5416 | 0.000654 | 0.000572 |
| | 2580.836 | 2583.9968 | 2583.876 | 0.001225 | 0.001178 |
| Broadway | 48010.019 | 48014.5216 | 48014 | 0.000094 | 0.000083 |
| | 16072.326 | 16076.0624 | 16075.8256 | 0.000232 | 0.000218 |
| | 6691.9584 | 6695.156 | 6695.0304 | 0.000478 | 0.000459 |
| | 3167.6568 | 3170.7416 | 3170.668 | 0.000974 | 0.000951 |
| Landing2 | 49876.988 | 49879.5456 | 49879.248 | 0.000051 | 0.000045 |
| | 18280.758 | 18282.808 | 18282.5192 | 0.000112 | 0.000096 |
| | 6870.3184 | 6872.0864 | 6871.9544 | 0.000257 | 0.000238 |
| | 2797.4904 | 2799.1304 | 2798.9968 | 0.000586 | 0.000538 |
| BranCastle2 | 96070.905 | 96077.2616 | 96073.6552 | 0.000066 | 0.000029 |
| | 36287.042 | 36290.9232 | 36289.2384 | 0.000107 | 0.000061 |

TABLE 3-continued

Bit rate control error comparison

| Panoramic video sequence | Target bit rate | The coding bit rate of the method of the present application | VTM bit rate control | The control error of the method of the present application | System bit rate control algorithm error |
|---|---|---|---|---|---|
| | 14923.741 | 14926.928 | 14925.648 | 0.000214 | 0.000128 |
| | 6568.724 | 6571.5712 | 6570.4824 | 0.000433 | 0.000268 |
| Pole Vault | 40596.748 | 40600.9056 | 40599.1864 | 0.000102 | 0.000060 |
| | 9247.2 | 9249.4936 | 9248.9784 | 0.000248 | 0.000192 |
| | 2961.1496 | 2963.008 | 2962.6992 | 0.000628 | 0.000523 |
| | 1193.472 | 1195.0256 | 1194.7432 | 0.001302 | 0.001065 |
| AerialCity | 15349.69 | 15353.072 | 15351.9936 | 0.000220 | 0.000150 |
| | 2668.7 | 2670.568 | 2670.6288 | 0.000700 | 0.000723 |
| | 862.1472 | 863.7624 | 863.8384 | 0.001873 | 0.001962 |
| | 380.8712 | 382.2752 | 382.3784 | 0.003686 | 0.003957 |
| DrivingInCity | 17850.879 | 17852.9432 | 17852.7232 | 0.000116 | 0.000103 |
| | 5289.0208 | 5290.5736 | 5290.4624 | 0.000294 | 0.000273 |
| | 2175.0448 | 2176.4624 | 2176.3312 | 0.000652 | 0.000591 |
| | 1049.7816 | 1051.2616 | 1051.1016 | 0.001410 | 0.001257 |
| DirvingInCountry | 37728.794 | 37732.4488 | 37730.9216 | 0.000097 | 0.000056 |
| | 10499.605 | 10502.4976 | 10501.3424 | 0.000276 | 0.000165 |
| | 4032.508 | 4034.6264 | 4034.1704 | 0.000525 | 0.000412 |
| | 1686.0304 | 1687.7632 | 1687.6248 | 0.001028 | 0.000946 |
| Total | | | | 0.000891 | 0.000780 |

Table 4 shows the performance of this scheme on coding time. The total coding time of all the sequences is reduced from 3972 hours to 3963 hours.

TABLE 4

Coding time comparison

| Panoramic video sequence | Coding time of Vtm bit rate control algorithm | The coding time of the method of the present application |
|---|---|---|
| Trolley | 48.62 | 49.83 |
| | 32.05 | 31.50 |
| | 22.61 | 21.53 |
| | 16.01 | 14.99 |
| GasLamp | 22.85 | 22.66 |
| | 17.90 | 16.06 |
| | 14.06 | 13.41 |
| | 10.75 | 10.26 |
| Skateboarding_in_lot | 133.23 | 166.90 |
| | 99.94 | 98.36 |
| | 56.13 | 54.64 |
| | 31.05 | 31.00 |
| ChairliftRide | 101.39 | 103.37 |
| | 61.04 | 61.46 |
| | 38.57 | 38.93 |
| | 24.68 | 25.13 |
| KiteFlite | 66.09 | 65.29 |
| | 43.43 | 42.63 |
| | 29.61 | 29.21 |
| | 20.79 | 20.75 |
| Harbor | 42.03 | 42.33 |
| | 28.15 | 27.41 |
| | 18.77 | 17.81 |
| | 12.77 | 12.30 |
| Balboa | 213.93 | 211.90 |
| | 132.81 | 130.94 |
| | 81.96 | 81.55 |
| | 54.02 | 54.08 |
| Broadway | 237.46 | 235.81 |
| | 141.53 | 139.38 |
| | 89.39 | 87.49 |
| | 60.18 | 59.60 |
| Landing2 | 161.03 | 158.36 |
| | 107.84 | 108.27 |
| | 71.70 | 71.83 |
| | 44.82 | 44.34 |
| BranCastle2 | 211.87 | 211.92 |
| | 164.18 | 162.89 |
| | 108.63 | 107.55 |
| | 73.80 | 73.49 |
| PoleVault | 171.27 | 167.84 |
| | 73.43 | 68.95 |
| | 35.28 | 33.43 |
| | 21.40 | 20.85 |
| AerialCity | 120.22 | 114.65 |
| | 40.12 | 40.43 |
| | 22.09 | 21.39 |
| | 14.04 | 13.95 |
| DrivingInCity | 107.87 | 106.58 |
| | 52.69 | 51.92 |
| | 31.91 | 31.32 |
| | 20.55 | 20.30 |
| DirvingInCountry | 149.89 | 153.83 |
| | 84.85 | 82.53 |
| | 49.58 | 48.47 |
| | 29.81 | 30.03 |
| Grand total | 3972.65 | 3963.62 |

What is claimed is:

1. A zero-delay panoramic video bit rate control method considering time-domain distortion propagation, comprising the following steps:
   S1: inputting a target bit rate and a sequence to be coded to an encoder;
   S2: determining whether a current frame is a first frame, and if so, performing the following operations:
   calculating a latitude value corresponding to a coding tree unit (CTU) line and calculating an area stretching ratio of a spherical surface and a projection plane thereof, initializing parameters of a bit rate control unit, calculating a number of target bits of the current frame, calculating a frame-level Lagrange multiplier of the current frame according to the number of the target bits,
calculating a frame-level quantization parameter (QP) according to the frame-level Lagrange multiplier and performing intraframe coding,
repeating step S2 after coding the current frame, and otherwise, entering step S3;
S3: calculating pixel mean and variance values of a frame;
S4: determining whether a current frame number is greater than twice a Group of Pictures (GOP) size, if the current frame number is greater than twice the GOP size, entering S5, otherwise, entering S6;
S5: calculating a global Lagrange multiplier according to an iterative algorithm, optimizing bit allocation of each CTU in the frame, and entering step S7;
S6: using a bit allocation algorithm of the encoder to allocate bits for each CTU in the frame;
S7: calculating the frame-level Lagrange multiplier and QP;
S8: coding the CTUs in sequence;
S9: determining whether a difference value between pixel variance values of the current frame and a previous frame is greater than a threshold, if so, entering step S10, otherwise, entering step S11;
S10: adjusting a Lagrange multiplier of the current CTU according to the area stretching ratio obtained in step S2, and entering step S13;
S11: determining the current frame number is greater than 3, if so, entering S13, otherwise, entering S10;
S12: adjusting a Lagrange multiplier of each CTU according to a time-domain distortion influence factor of the previous frame and the area stretching ratio obtained in S2;
S13: calculating QPs of the current CTU according to the Lagrange multiplier of the current CTU calculated in S10 or S12, and coding the CTU;
S14: determining whether the current CTU is the last CTU, if so, coding the current frame and entering step S15, otherwise, returning to step S8;
S15: updating bit rate control parameters and a number of actually used bits of the current frame and each CTU;
S16: acquiring a reconstruction error and a motion compensation prediction error of each CTU saved in the current frame to calculate a time-domain distortion influence factor of each CTU in the current frame;
S17: determining whether the current frame is the last frame, if so, entering S18, otherwise, entering S2; and
S18: completing coding of a current panoramic video sequence.

2. The zero-delay panoramic video bit rate control method considering time-domain distortion propagation according to claim 1, wherein in step S2, a method for calculating the area stretching ratio is as follows: if a radius of a panoramic video sphere is defined as r, an area of a spherical girdle region with a latitude θ is:

$$S_s(\theta) = 2\pi \cdot r^2 \cdot \cos\theta \cdot \sin d\theta$$

after being projected onto a 2D plane, an area of a stretching region is obtained as follows:

$$S_E(\theta) = S_E\left(\frac{\pi}{2}\right) = 2\pi \cdot r^2 \cdot \sin d\theta$$

then the area stretching ratio is:

$$k(\theta) = \frac{S_S(\theta)}{S_E(\theta)} = \frac{S_S(\theta)}{S_E(0^0)} = \cos\theta.$$

3. The zero-delay panoramic video bit rate control method considering time-domain distortion propagation according to claim 2, wherein step S5 is as follows:

$$R = \sum_{i=1}^{M} r_i = \sum_{i=1}^{M}\left(\frac{\lambda_g}{c_i \cdot k_i}\right)^{\frac{-1}{k_i+1}} = \sum_{i=1}^{M}\left(\frac{\alpha_i}{\lambda_g}\right)^{\beta_i}$$

wherein R and r are respectively frame-level and CTU-level target bits, $\lambda_g$ is the global Lagrange multiplier, $a_i = c_i \cdot k_i$, $$\beta_i = \frac{1}{k_i+1},\ c_i = \frac{D_i}{R_i^{-\lambda_i \frac{R_i}{D_i}}},\ k_i = \frac{\lambda_i \cdot R_i}{D_i},$$

$\lambda_i$ is a slope of a rate-distortion curve, $D_i$ and $R_i$ are respectively distortion and coding bit of an $i^{th}$ coding unit, and M is a number of CTUs.

4. The zero-delay panoramic video bit rate control method considering time-domain distortion propagation according to claim 3, wherein in step S10, a method for adjusting the Lagrange multiplier is as follows:

$$\lambda_n = \frac{\lambda_p}{k(\theta)}$$

wherein $\lambda_p$ is the frame-level Lagrange multiplier, and $\lambda_n$ is an adjusted Lagrange multiplier.

5. The zero-delay panoramic video bit rate control method considering time-domain distortion propagation according to claim 3, wherein in step S12, a method for adjusting the Lagrange multiplier is as follows:

$$\lambda_n = \frac{\lambda_p}{k *_{k(\theta)}}$$

wherein k is the time-domain distortion influence factor.

* * * * *